United States Patent
Seyler et al.

(10) Patent No.: US 7,757,721 B2
(45) Date of Patent: Jul. 20, 2010

(54) MULTILAYER PIPE

(75) Inventors: Andreas Seyler, Gruendau-Lieblos (DE); Michael Schieb, Schoellkrippen (DE); Martin Ehret, Freigericht (DE); Thorsten Desch, Gelnhausen-Höchst (DE)

(73) Assignee: Veritas AG, Glenhausen (DE)

( * ) Notice: Subject to any disclaimer, the term of this patent is extended or adjusted under 35 U.S.C. 154(b) by 1276 days.

(21) Appl. No.: 10/352,884

(22) Filed: Jan. 29, 2003

(65) Prior Publication Data

US 2008/0128042 A1 Jun. 5, 2008

(30) Foreign Application Priority Data

Jan. 30, 2002 (DE) ................. 102 03 626

(51) Int. Cl.
*F16L 11/00* (2006.01)
(52) U.S. Cl. .............. 138/137; 138/141; 428/36.91
(58) Field of Classification Search ............. 138/137, 138/141; 428/36.91
See application file for complete search history.

(56) References Cited

U.S. PATENT DOCUMENTS

| | | | |
|---|---|---|---|
| 4,810,542 A * | 3/1989 | Kawai et al. ............. | 428/36.7 |
| 5,937,911 A | 8/1999 | Kodama et al. | |
| 6,170,535 B1 * | 1/2001 | Sadr et al. .................... | 138/137 |
| 6,179,008 B1 * | 1/2001 | Kawazura et al. ........... | 138/125 |
| 6,355,321 B1 * | 3/2002 | Nishino et al. ........... | 428/36.91 |
| 6,576,312 B1 * | 6/2003 | Ito et al. .................. | 428/36.91 |
| 7,150,295 B2 * | 12/2006 | Katayama et al. ........... | 138/137 |
| 2003/0121560 A1 * | 7/2003 | Morohoshi et al. .......... | 138/137 |
| 2003/0226608 A1 * | 12/2003 | Ainsworth ................... | 138/137 |
| 2004/0013835 A1 * | 1/2004 | Miguel .................... | 428/36.91 |
| 2004/0187948 A1 * | 9/2004 | Shifman .................... | 138/125 |

FOREIGN PATENT DOCUMENTS

| | | |
|---|---|---|
| DE | 4214383 C1 | 9/1993 |
| DE | 29905010 U1 | 7/1999 |
| DE | 69610379 T2 | 4/2001 |
| EP | 1 002 980 | 5/2000 |
| EP | 1 077 341 | 2/2001 |
| WO | WO 97/44186 | 11/1997 |
| WO | WO 99/57473 | 11/1999 |

* cited by examiner

*Primary Examiner*—James F Hook
(74) *Attorney, Agent, or Firm*—Buchanan Ingersoll & Rooney PC

(57) ABSTRACT

The present invention relates to a multilayer pipe or hose, in particular a plastic pipe, comprising at least one polyester barrier layer and at least one additional protective layer, the additional protective layer being a polyethylene layer, in particular a HDPE layer, and the barrier layer and the protective layer being are interconnected via at least one adhesion promoter layer.

8 Claims, 1 Drawing Sheet

MULTILAYER PIPE

FIELD OF THE INVENTION

The present invention relates to a multilayer pipe or hose, in particular a fuel pipe, comprising at least one polyester barrier layer and at least one additional protective layer.

BACKGROUND OF THE INVENTION

For use in a fuel line system of a motor vehicle or of some other vehicle various kinds of hoses are known, which can be produced from different materials. Such a hose can be used as the fuel line itself or as a connecting piece for connecting a fuel line and it can be implemented as a flexible or as an inflexible component. Normally, these lines are used for conveying petrol or diesel fuel to the engine, guaranteeing pressure compensation at and in the fuel tank, connecting the activated carbon filter to the air vent system, and regenerating said activated carbon filter by a supply of fuel.

With regard to the prevailing environmental protection and safety considerations, the pipes and hoses, respectively, have to fulfill the requirement that permeation of the conventional fuels through walls is suppressed to the highest possible degree. A measure which proved to be useful for this purpose is the arrangement of a barrier or blocking layer in the hose, which satisfies these safety requirements. Pipes which proved to be increasingly useful in this respect are pipes comprising in addition to the barrier layer also further layers, e.g. a protective layer and an adhesion promoter layer, so as to impart the necessary strength and durability to the hose.

The material used for the support layer normally consists of polyamide materials, e.g. PA 11/12. These known fuel lines proved to be disadvantageous insofar as the material used for the support layer entails high costs. This is particularly relevant as far as tank ventilation pipes are concerned, since these tank ventilation pipes have, on the one hand, comparatively large and long dimensions and are, on the other hand, only subjected to very small loads form the mechanical as well as from the chemical point of view. Since polyamides produce, in addition, only a comparatively poor blocking effect against fuels, it is obvious to use for these lines—which are located on the tank—a material, as a support material, which corresponds to that of the tank itself. PE, especially HDPE, is therefore an obvious material to use.

Furthermore, U.S. Pat. No. 5,937,911 discloses a fuel supply hose comprising an inner layer of fluorine-containing resin, an intermediate layer consisting e.g. of a polybutylene terephthalate, and an outer layer produced from a rubber material. In order to guarantee sufficient adhesive strength between the individual layers, it is here necessary to form a coherent structure of the individual layers by heat treatment and vulcanization. Another example of a pipe composed of only two layers is described in example No. 23 and table 11. The outer layer consists here of a polybutylene terephthalate and the inner layer is formed of a copolymer consisting of ethylene and tetrafluoroethylene. In this case, only a surface treatment of the inner layers has been executed in order to improve the adhesive strength. The results achieved show a very poor or a comparatively poor peel strength, which results in peeling off or in a separation of the inner and outer layers.

Also DE 42 14 383 describes the advantageous effect of polyesters, e.g. PBT, in particular their blocking effect against pure hydrocarbons as well as alcohol and, simultaneously, against mixtures of these substances, in the case of which the percentage of alcohol can vary over a wide concentration range. In comparison with the known polyamides used in fuel lines, e.g. PA11 or PA12, polyester has, however, a lower resistance to hydrolysis so that this material cannot be used as a monopipe, but can here be used as a layer in a multilayer pipe.

In DE 42 14 383 a fuel pipe is suggested, which comprises an outer layer of polyester, e.g. PBT, a subsequent adhesion promoter layer consisting of a polymer, in particular of polyurethane, and an additional layer arranged in the interior of the pipe and consisting preferably of polyamide. The adhesion promoter layer is in this respect necessary, since the adherence between polyesters and polyamides is often insufficient. In this connection, it is also possible to arrange more than one adhesion promoter layer between the inner layer and the outer layer. The polyamide layer is, however, disadvantageous insofar as this material is, on the one hand, very expensive and, on the other hand, unsatisfactory in view of the known permeation of the fuels through the wall and the resultant swelling. Although part of these disadvantages are diminished by the use of a PA layer in a multilayer hose, the surface treatments used for improving the adhesive strength between the individual layers are, however, often very complicated and expensive so that the total cost for the hose is increased substantially.

SUMMARY OF THE INVENTION

It is therefore the object of the present invention to provide a multilayer pipe or hose, in particular a fuel pipe, which has excellent properties as far as its resistance to fuels is concerned, without having, however, the drawbacks of known hoses.

For a multilayer pipe or hose, in particular a fuel pipe comprising at least one polyester barrier layer and at least one additional protective layer, this object is achieved in that the additional protective layer is a polyethylene layer, in particular a HDPE layer, and in that the barrier layer and the protective layer are interconnected via at least one adhesion promoter layer.

Surprisingly enough, it turned out that a multilayer pipe comprising a polyester barrier layer and a polyethylene protective layer has excellent blocking properties against engine fuels. By means of the adhesion promoters provided between the two layers, it is guaranteed that a sufficient connection exists between the two layers.

According to a preferred embodiment, the polyester barrier layer can be arranged in the pipe as an interior layer. Since it turned out that especially the polyester barrier layer has excellent blocking properties against pure hydrocarbons as well as alcohol, it proved to be particularly advantageous to arrange this layer in direct contact with the engine fuel.

It will here be advantageous to select the polyester barrier layer from the group consisting of polyethylene terephthalate (PET), polybutylene terephthalate (PBT), polyethylene naphthalate (PEN) or polybutylene naphthalate. The use of polybutylene terephthalate is specially preferred. The above-mentioned polyester proved to be particularly advantageous for use in a fuel hose.

According to another embodiment, two adhesion promoter layers can be provided. Due to the use of two adhesion promoter layers, it is possible to achieve a better adherence between the layers, since it is not necessary to select a layer which is compatible with the inner as well as with the outer layer.

According to an advantageous embodiment, a first adhesion promoter layer can be arranged on the polyester barrier layer and consist of a polyamide-polyester composition, preferably a mixture in a ratio of 1:1 or in a similar ratio. Surprisingly enough, it turned out that, although the adherence between polyester and polyamides is often insufficient, a mixture of these two materials can be used as an adhesion promoter layer in an advantageous manner.

According to another embodiment, the second adhesion promoter layer can be arranged between the protective layer and the first adhesion promoter layer and consist of a copolymerized polyethylene, in particular of a HPDE modified with maleic anhydride. This material proved to be particularly useful for guaranteeing a good adherence between the first adhesion promoter layer consisting of a polyamide-polyester composition and the polyethylene layer.

When shown exemplarily in the case of an 8×1 pipe, the thicknesses of the individual layers can be as follows according to another embodiment: inner barrier layer 0.4 mm, first adhesion promoter layer 0.1 mm, second adhesion promoter layer 0.1 mm, outer protective layer 0.4 mm. These layer thicknesses proved to be particularly advantageous in use.

The multilayer pipes or hoses according to the present invention are characterized by advantageous properties comprising an excellent processability of the materials, both as individual and as composite materials, and particularly good permeation properties which suffice to satisfy the present environmental protection and safety regulations. These advantageous properties can be achieved by means of a pipe that can be produced at a reasonable price.

BRIEF DESCRIPTION OF THE DRAWING

In the following, the invention will be explained in detail making reference to the drawing enclosed. The FIGURE shows a sectional view of an embodiment of the invention in the form of a tank vent line used in a fuel line system of a motor vehicle.

DETAILED DESCRIPTION OF THE INVENTION

Figure 1:
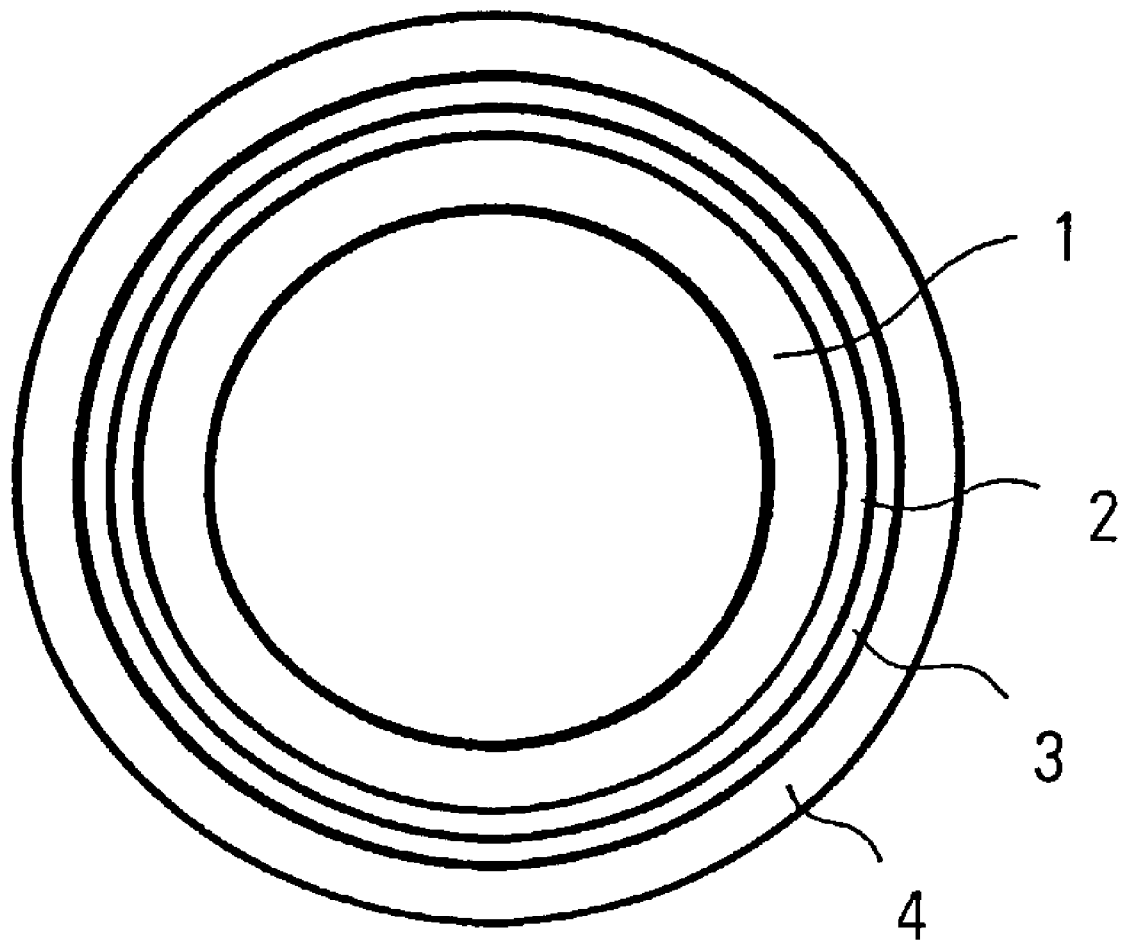

The pipe according to the present invention consists of a plurality of interconnected layers. In the interior of the pipe, in direct contact with the fuel, a barrier layer 1 is arranged, which consists of polybutylene terephthalate (PBT). This barrier layer is followed by a first adhesion promoter layer 2 consisting of a polyamide-polyester composition. On the outer side of this first adhesion promoter layer 2, a second adhesion promoter layer 3 is arranged, which consists of a HDPE modified with maleic anhydride. The two successive adhesive layers offer the advantage of a long-lasting improved adherence in comparison with known adhesion promoters consisting of only one layer.

The outer layer is provided in the form of a HDPE layer. The individual layers are preferably implemented such that the inner layer 1 and the outer layer 4 have the same thickness, preferably a thickness of 0.4 mm, and that the individual adhesion promoter layers have identical thicknesses, preferably 0.1 mm.

The pipe proved to be particularly suitable for pressureless applications, in particular pressureless tank venting.

The invention claimed is:

1. A multilayer pipe or hose comprising:
   at least one polyester barrier layer;
   at least one protective layer, wherein the protective layer is a polyethylene layer;
   a first adhesion promoter layer, which consists of a polyamide-polyester composition, the barrier layer and the protective layer being interconnected via the first adhesion promoter layer;
   a second adhesion promoter layer arranged between the protective layer and the first adhesion promoter layer, the second adhesion promoter layer consisting of a HDPE modified with maleic anhydride.

2. A multilayer pipe or hose according to claim 1, wherein the polyester barrier layer is arranged as an interior layer within the pipe.

3. A multilayer pipe or hose according to claim 1, wherein the polyester barrier layer is selected from the group consisting of polyethylene terephthalate (PET), polybutylene terephthalate (PBT), polyethylene naphthalate (PEN), and polybutylene naphthalate.

4. A multilayer pipe or hose according to claim 1, wherein the polyamide-polyester composition of the first adhesion promoter layer consists of a mixture in a ratio of approx. 1:1.

5. A multilayer pipe or hose according to claim 1, wherein the inner barrier layer and the outer protective layer have essentially the same thickness and are many times thicker than each of the adhesion promoter layers.

6. A multilayer pipe or hose according to claim 1, wherein the thicknesses of the individual layers are a follows: inner barrier layer 0.4 mm, first adhesion promoter layer 0.1 mm, second adhesion promoter layer 0.1 mm, outer protective layer 0.4 mm.

7. The multilayer pipe or hose according to claim 1, wherein the protective layer is a HDPE layer.

8. The multilayer pipe or hose according to claim 1, wherein the multilayer pipe or hose is a fuel pipe.

* * * * *